US009269399B2

(12) United States Patent
Wing et al.

(10) Patent No.: US 9,269,399 B2
(45) Date of Patent: Feb. 23, 2016

(54) CAPTURE, SYNCING AND PLAYBACK OF AUDIO DATA AND IMAGE DATA

(75) Inventors: Tse Hong Wing, Kowloon (HK); Newton Guillen, Carmel, IN (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 158 days.

(21) Appl. No.: 13/158,643

(22) Filed: Jun. 13, 2011

(65) Prior Publication Data

US 2012/0315013 A1    Dec. 13, 2012

(51) Int. Cl.
*H04N 9/80* (2006.01)
*G11B 27/32* (2006.01)
*H04N 5/77* (2006.01)
*H04N 9/804* (2006.01)
*H04N 9/806* (2006.01)

(52) U.S. Cl.
CPC .............. *G11B 27/329* (2013.01); *H04N 5/772* (2013.01); *H04N 9/8042* (2013.01); *H04N 9/8063* (2013.01)

(58) Field of Classification Search
CPC ..... H04N 5/85; H04N 9/8042; G11B 27/329; G11B 27/034
USPC .......................................................... 386/239
See application file for complete search history.

(56) References Cited

U.S. PATENT DOCUMENTS

| | | | |
|---|---|---|---|
| 5,784,525 A | 7/1998 | Bell | |
| 6,148,173 A | 11/2000 | Bell | |
| 6,442,350 B1 | 8/2002 | Stephany et al. | |
| 7,106,369 B2 | 9/2006 | Baron | |
| 2003/0055532 A1* | 3/2003 | Sakagami et al. | 700/245 |
| 2007/0038458 A1* | 2/2007 | Park | 704/270 |
| 2008/0052267 A1* | 2/2008 | Hayashibara | 707/2 |
| 2009/0041428 A1* | 2/2009 | Jacoby et al. | 386/104 |
| 2009/0041429 A1* | 2/2009 | Mae et al. | 386/112 |
| 2009/0225173 A1* | 9/2009 | Ogawa | 348/207.99 |
| 2010/0007732 A1* | 1/2010 | Tolmei | 348/143 |
| 2013/0121662 A1* | 5/2013 | Moorer | 386/240 |

* cited by examiner

*Primary Examiner* — William C Vaughn, Jr.
*Assistant Examiner* — Daniel Tekle
(74) *Attorney, Agent, or Firm* — F. Chau & Associates, LLC

(57) ABSTRACT

A capture device includes a microphone, a camera, a memory, and a processor. The microphone is configured to record audio data, the camera is configured to capture image data, the memory is configured to store the recorded audio data and the captured image data, and the processor is configured to link the recorded audio data with the captured image data based on a timestamp of the image data, and store the linked audio data and image data in a same record in the memory.

15 Claims, 8 Drawing Sheets

CAPTURE, SYNCING AND PLAYBACK OF AUDIO DATA AND IMAGE DATA

BACKGROUND

1. Technical Field

The present disclosure relates to capture, syncing and playback of audio data and image data, and more particularly, to a system and method for capture, syncing and playback of audio data and image data.

2. Discussion of Related Art

There are a variety of content capture devices available today such as, for example, digital still cameras, camcorders, and voice recorders. In certain situations, a user may wish to capture certain audio and video content, but may not wish to capture full motion video content. For example, while recording a lecture, concert, or interview, a user may be primarily concerned with capturing audio content, but may also wish to capture some still images or brief video clips corresponding to the audio content. In addition to a user preferring not to capture full motion video with audio in situations where the audio content is the user's primary concern, capturing full motion video with audio may also result in files that are too large in size to store on the content capture device used by the user.

BRIEF SUMMARY

According to an exemplary embodiment of the present disclosure, a capture device includes a microphone, a camera, a memory, and a processor. The microphone is configured to record audio data. The camera is configured to capture image data. The memory is configured to store the recorded audio data and the captured image data. The processor is configured to link the recorded audio data with the captured image data based on a timestamp of the image data, and store the linked audio data and image data in the same record in the memory.

According to an exemplary embodiment of the present disclosure, a method of capturing image data while recording audio data includes recording the audio data, capturing the image data, linking the recorded audio data and the captured image data based on a timestamp of the capture image data, and storing the linked audio data and image data in the same record in the memory in a capture device. The audio data is recorded by a microphone in the capture device. The image data is captured by a camera in the capture device. The recorded audio data and the captured image data are linked by a processor in the capture device.

According to an exemplary embodiment of the present disclosure, a computer-implemented method of displaying captured image data includes selecting a recorded audio file that is linked to at least one captured image file using a timestamp, playing audio data corresponding to the recorded audio file, and displaying the captured image file at a predetermined time while playing the audio data based on the timestamp. The computer-implemented method may be executed by a processor.

According to an exemplary embodiment of the present disclosure, a computer-implemented method of playing recorded audio data includes selecting a captured image file that is linked to an audio file corresponding to the recorded audio data using a timestamp, and playing the recorded audio data at a starting point corresponding to the timestamp. The computer-implemented method may be executed by a processor.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

According to exemplary embodiments of the present disclosure, a capture device may record audio data and capture images and/or video clips as separate files, and associate the audio data with the images and/or video clips using timestamps. Selecting/rendering an image/video file will result in the playback of the associated audio file, and selecting/rendering the audio file will result in the playback of the associated image/video file. One skilled in the art will appreciate that although exemplary embodiments described herein discuss capturing image data and associating the captured image data with recorded audio data, video data may also be captured and associated with recorded audio data.

As will be appreciated by one skilled in the art, aspects of the present disclosure may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Exemplary embodiments of the present disclosure now will be described more fully hereinafter with reference to the accompanying drawings. This disclosure, may however, be embodied in many different forms and should not be construed as limited to the embodiments set forth herein.

According to an exemplary embodiment of the present disclosure, a capture device records various types of media content such as, for example, audio data and image data. The capture device may simultaneously record audio data and capture image data (e.g., still images). Once recorded and captured, the audio and image data may be stored in the capture device for subsequent playback.

Figure 1:
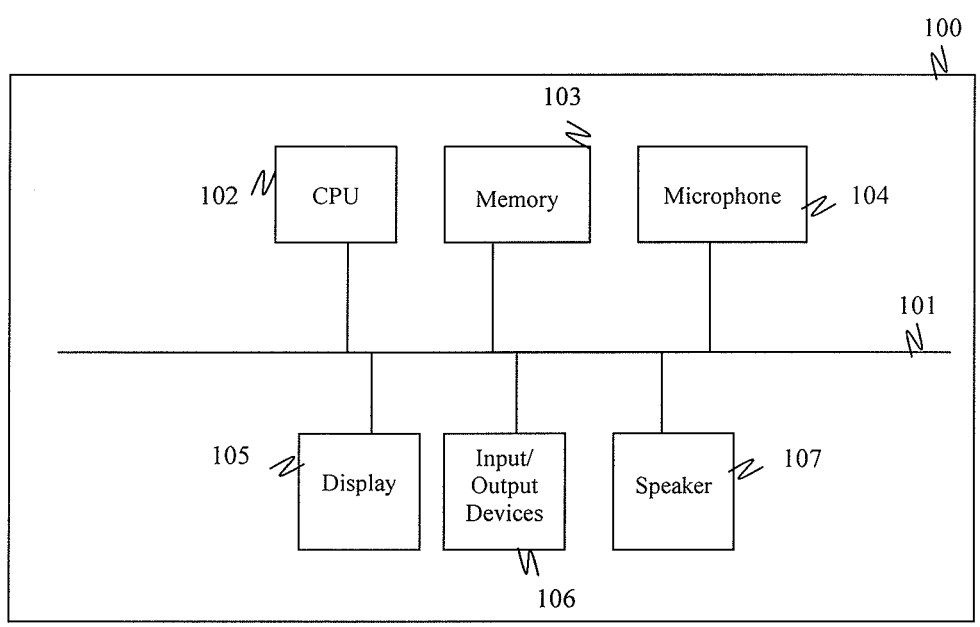
FIG. 1 is a block diagram of the capture device, according to an exemplary embodiment of the present disclosure.

A block diagram of the capture device according to an exemplary embodiment is shown in FIG. 1. The capture device 100 may include, inter alia, a data bus 101, a central processing unit (CPU) 102, a memory 103, a microphone 104, a display 105, various input/output devices 106, and a speaker 107. The input/output devices 106 may include, for example, a combination of physical buttons and/or on-screen touch controls used to control various functions of the capture device 100. The capture device 100 may further implement voice recognition to recognize spoken commands and control various functions of the capture device 100 in response to the spoken commands.

Figure 2:
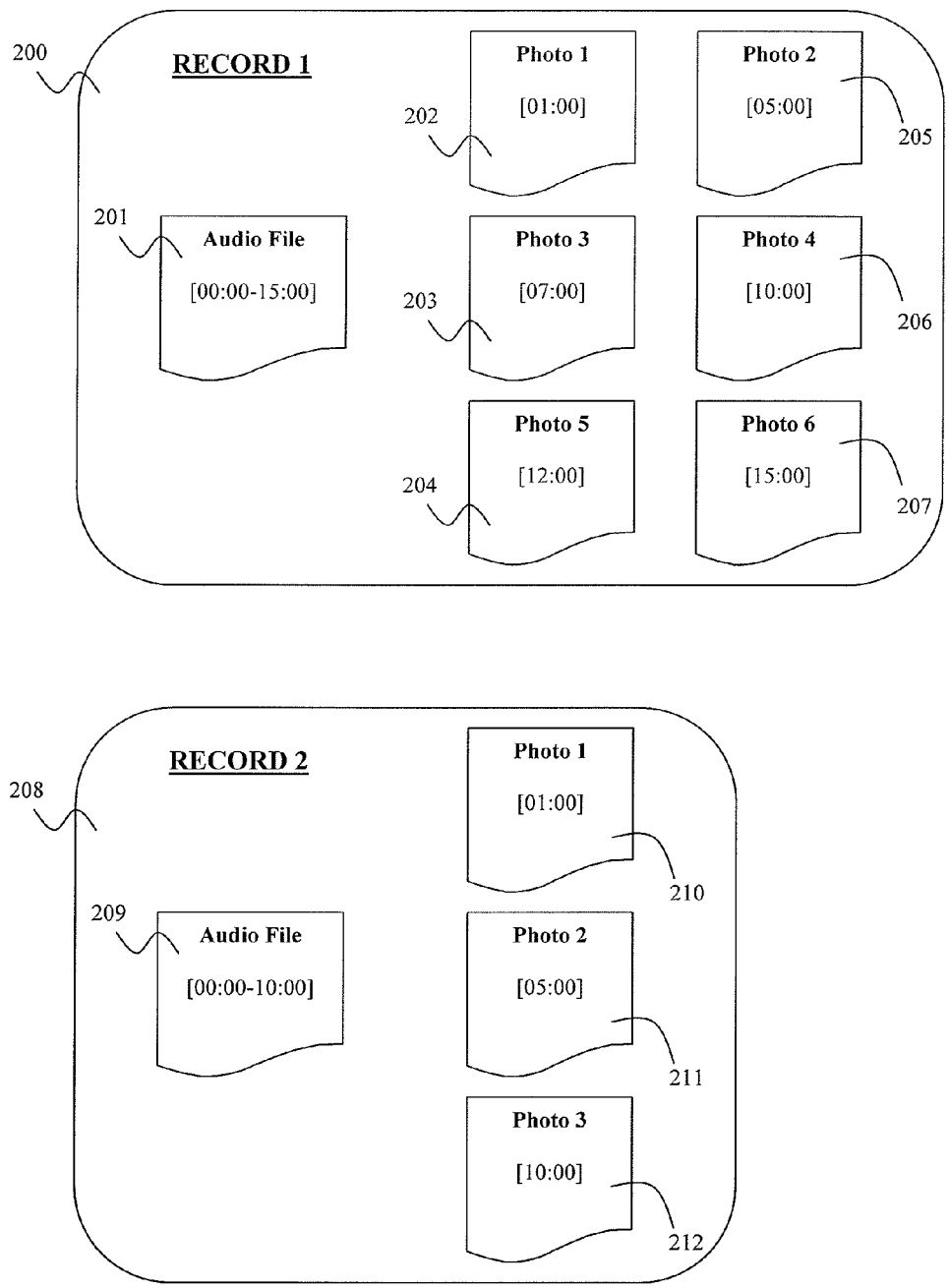
FIG. 2 shows audio data and image data stored as separate files and linked to each other in separate records, according to an exemplary embodiment of the present disclosure.

The audio and image data may be stored in the capture device as separate files in separate records. For example, as shown in FIG. 2, a first recorded audio file 201 and associated captured images 202-207 may be stored in a first record 200, and a second recorded audio file 209 and associated captured images 210-212 may be stored in a second record 208. The captured images within each record may be linked to the audio files in each respective record using a timestamp. For example, in record 1 200, the recorded audio file 201 has a duration of 15 minutes. Timestamps in photos 1 through 6 202-207 link the photos to the audio file 201 at the 1 minute mark, 5 minute mark, 7 minute mark, 10 minute mark, 12 minute mark, and 15 minute mark, respectively. In record 2 208, the recorded audio file 209 has a duration of 10 minutes. Timestamps in photos 1 through 3 210-212 link the photos to the audio file 209 at the 1 minute mark, 5 minute mark, and 10 minute mark, respectively. When a user selects the first audio file 201 for playback, the photos 202-207 associated with the first audio file 201 may be automatically played back by the capture device at the appropriate times, and when the user selects the second audio file 209 for playback, the photos 210-212 associated with the second audio file 209 may be automatically played back by the capture device at the appropriate times. Similarly, when the user selects one of the photos 202-207 associated with the first audio file 201 for playback, the first audio file 201 may be automatically played back by the capture device starting at the appropriate time, and when the user selects one of the photos 210-212 associated with the second audio file 209, the second audio file 209 may be automatically played back by the capture device starting at the appropriate time.

In an exemplary embodiment, audio data may be continuously recorded by the capture device. While the audio data is being recorded, image data is captured. Image data may be captured at specific points in time by the user. Image data may further be captured at specific time intervals defined by the user. For example, the user may set the capture device to capture an image every minute while audio data is being recorded. In addition, the user may manually capture images between the set intervals using, for example, a button disposed on the capture device.

Exemplary embodiments of the capture device may utilize various detection modes that allow the capture device to be trained prior to recording audio data so that while audio data is being continuously recorded, image data is captured upon the detection of certain events.

Figure 3:
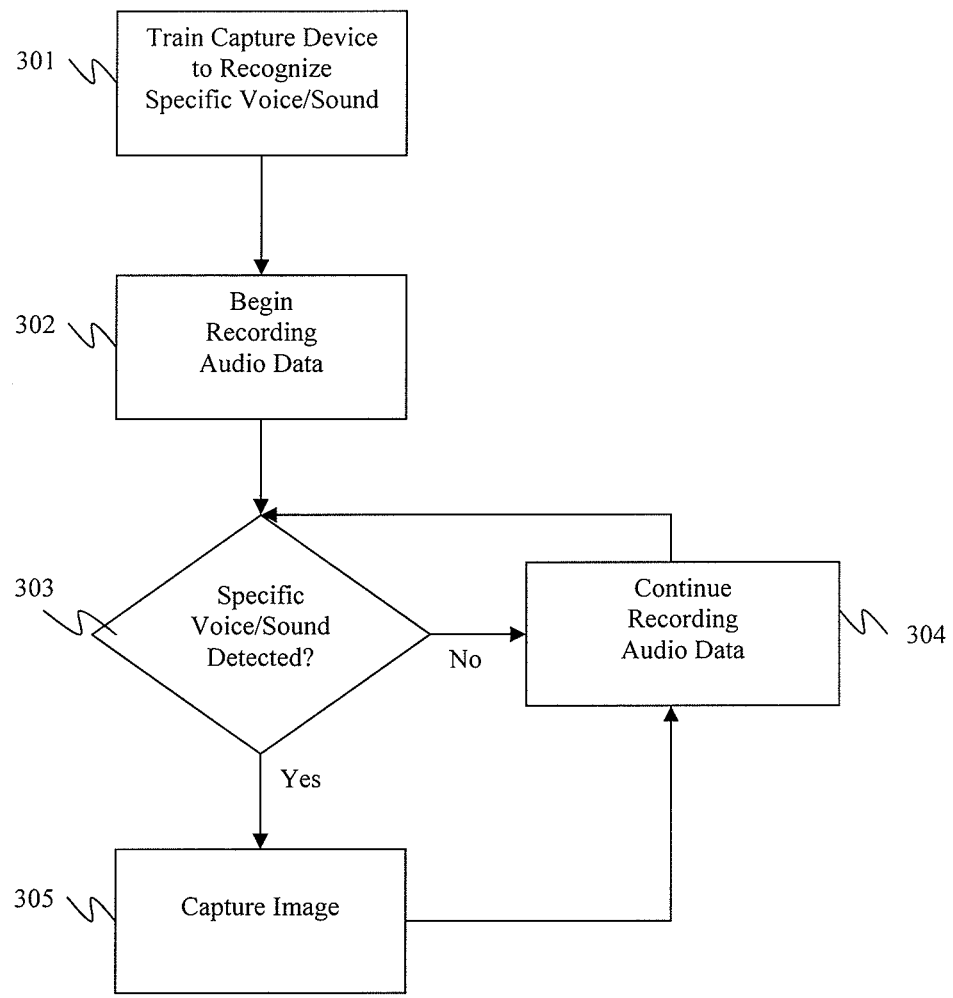
FIG. 3 is a flowchart illustrating a voice/sound detection mode of the capture device, according to an exemplary embodiment of the present disclosure.

FIG. 3 is a flowchart illustrating a voice/sound detection mode of the capture device.

Referring to FIG. 3, in a voice/sound detection mode, the capture device may automatically capture an image upon the detection of a specific voice or sound. Thus, while audio is being continuously recorded, an image may be automatically captured every time a certain person speaks, or a certain sound occurs. For example, at block 301, the capture device is trained to recognize a specific voice or sound. Training the capture device may include the user entering a training mode of the device and recording a specific voice or sound that will trigger the automatic capturing of an image. Once the recording of audio data has started at block 302, the capture device determines whether the specific voice or sound from the training mode has been detected at block 303. If the voice or sound has not been detected, the capture device continues recording audio data at block 304, and continues determining whether the specific voice or sound has been detected at block 303. Once the specific voice or sound has been detected, an image is automatically captured at bock 305. While in the voice/sound detection mode, the recording of audio data may be ended at any time. For example, the audio data may be recorded for a predetermined duration, or the recording of audio data may be ended at any point by the user. The voice/sound detection mode may further include other configurable options, as discussed below.

Figure 4:
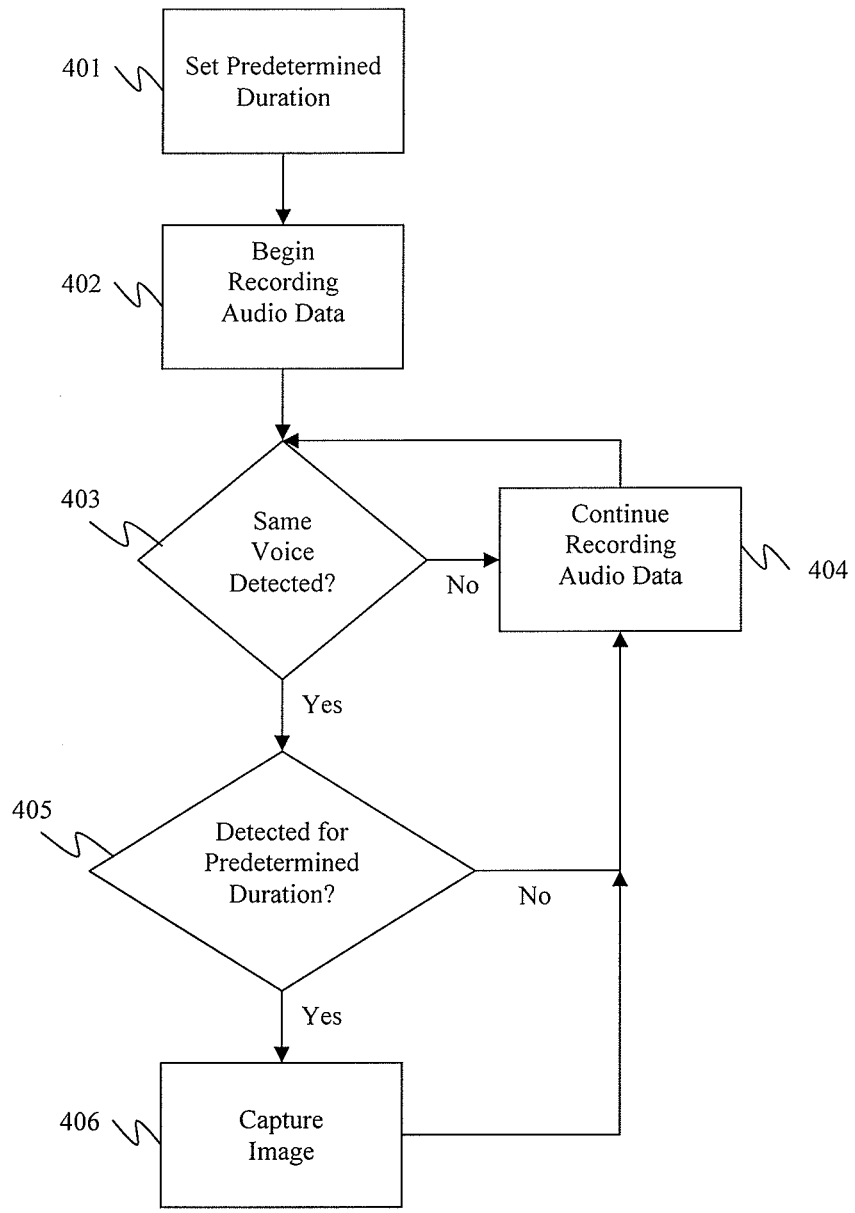
FIG. 4 is a flowchart illustrating a lecture detection mode of the capture device, according to an exemplary embodiment of the present disclosure.

FIG. 4 is a flowchart illustrating a lecture detection mode of the capture device.

Referring to FIG. 4, in a lecture detection mode, while audio is being continuously recorded, the capture device may automatically capture an image upon the detection of the same person speaking for a certain amount of time. For example, at block 401, the user may set a predetermined duration of time that the same voice must be detected before an image is automatically captured. Once the recording of audio data has started at block 402, the capture device determines whether the same voice has been detected at block 403. If the same voice has not been detected, the capture device continues recording audio data at block 404, and continues determining whether the same voice has been detected at block 403. At block 405, the capture device determines whether the same voice has been detected for the predetermined duration. If the same voice has not been detected for the predetermined duration, the capture device continues recording audio data at block 404. If the same voice has been detected for the predetermined duration, an image is automatically captured at block 406. While in the lecture detection mode, the recording of audio data may be ended at any time. For example, the audio data may be recorded for a predetermined duration, or the recording of audio data may be ended at any point by the user. The lecture detection mode may further include other configurable options, as discussed below.

Figure 5:
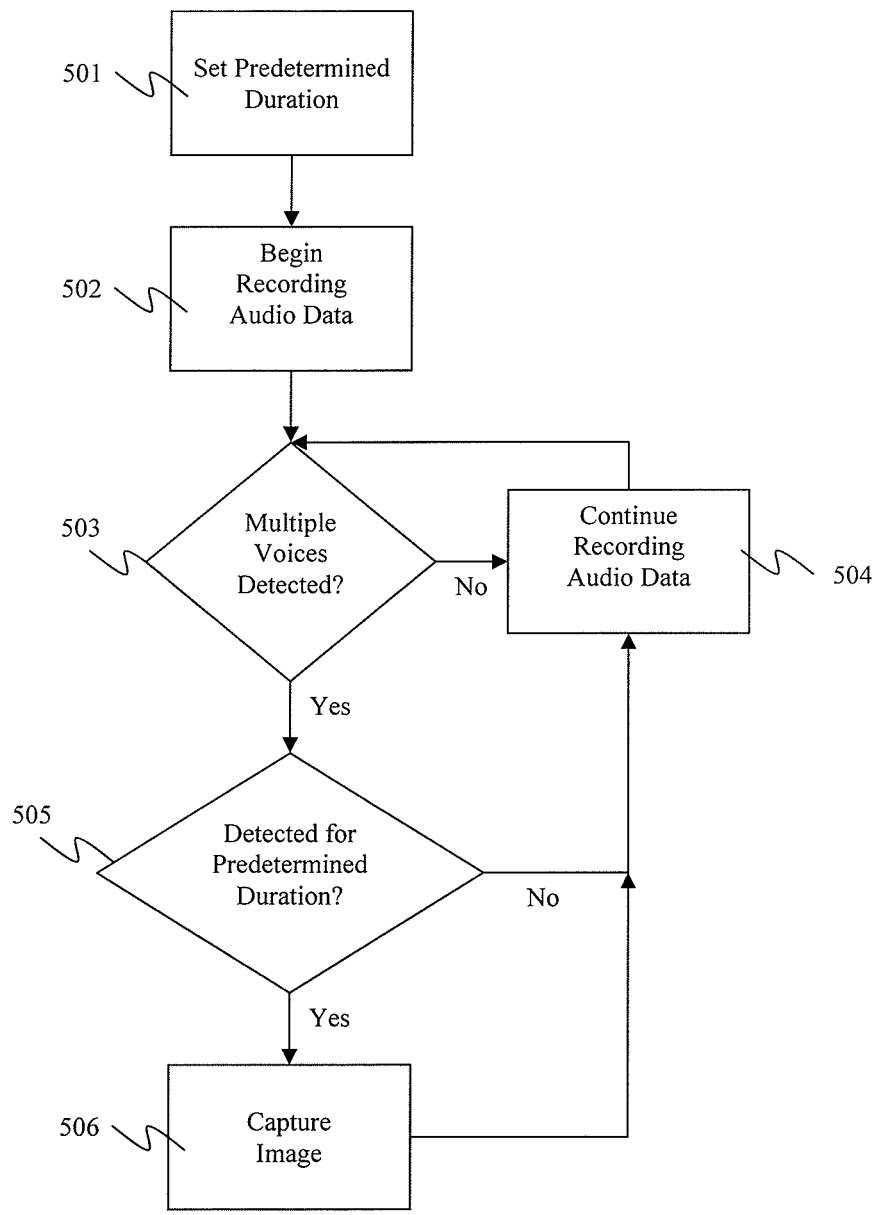
FIG. 5 is a flowchart illustrating a discussion detection mode of the capture device, according to an exemplary embodiment of the present disclosure.

FIG. 5 is a flowchart illustrating a discussion detection mode of the capture device.

Referring to FIG. 5, in a discussion detection mode, while audio is being continuously recorded, the capture device may automatically capture an image upon the detection of a discussion between multiple speakers occurring for a certain amount of time. For example, at block 501, the user may set a predetermined duration of time that multiple voices must be detected before an image is automatically captured. Once the recording of audio data has started at block 502, the capture device determines whether multiple voices have been detected at block 503. If multiple voices have not been detected, the capture device continues recording audio data at block 504, and continues determining whether multiple voices have been detected at block 503. At block 505, the capture device determines whether multiple voices have been detected for the predetermined duration. If multiple voices have not been detected for the predetermined duration, the capture device continues recording audio data at block 504. If multiple voices have been detected for the predetermined duration, an image is automatically captured at block 506. While in the discussion detection mode, the recording of audio data may be ended at any time. For example, the audio data may be recorded for a predetermined duration, or the recording of audio data may be ended at any point by the user. The discussion detection mode may further include other configurable options, as discussed below.

Figure 6:
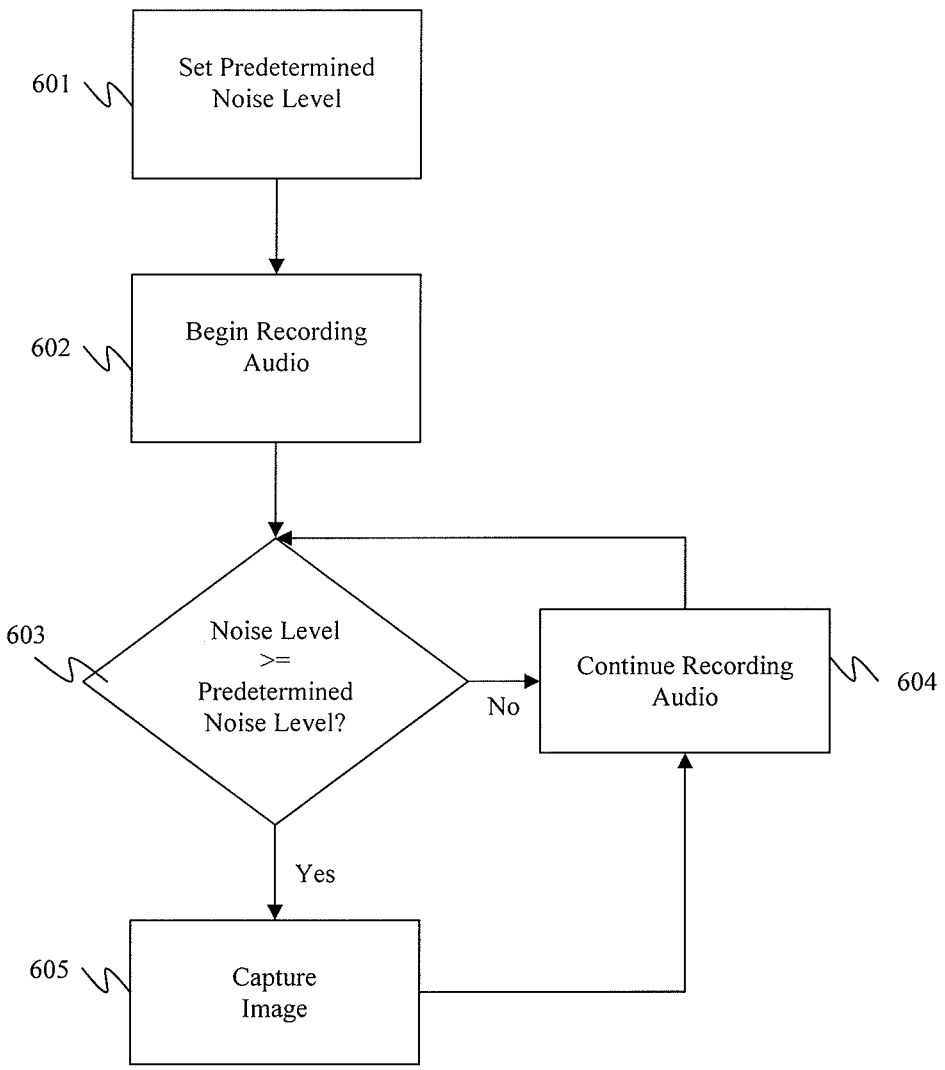
FIG. 6 is a flowchart illustrating a noise level detection mode of the capture device, according to an exemplary embodiment of the present disclosure.

FIG. 6 is a flowchart illustrating a noise level detection mode of the capture device.

Referring to FIG. 6, in a noise level detection mode, while audio is being continuously recorded, the capture device may automatically capture an image upon detecting a certain level of noise. For example, at block 601, the user may set a predetermined noise level (e.g., a certain decibel (dB) level). Once the recording of audio data has started at block 602, the capture device determines whether the detected noise level is greater than or equal to the predetermined noise level at block 603. If the detected noise level is not greater than or equal to the predetermined noise level, the capture device continues recording audio data at block 604. If the detected noise level is greater than or equal to the predetermined noise level, an image is automatically captured at block 605. While in the noise level detection mode, the recording of audio data may be ended at any time. For example, the audio data may be recorded for a predetermined duration, or the recording of audio data may be ended at any point by the user. The noise level detection mode may further include other configurable options, as discussed below.

In the detection modes described above with reference to FIGS. 3 to 6, rather than capturing a single image upon the detection of an event, multiple images may be captured at time intervals specified by the user. The user may further specify a delay that occurs between the detection of an event and the capturing of an image or images. For example, the capture device may be configured to capture an image a few seconds after detecting an event rather than capturing an image immediately upon detecting an event, and the capture device may be configured to capture a certain number of images every few seconds for a certain duration upon detecting an event. The values for the delay, the number of images to capture, and the duration to capture the images may be defined by the user.

In an exemplary embodiment, a user may record audio notes that are distinguished from the recorded audio data. Audio notes may be used as markers to identify the time in the audio recording that a specific event occurs. The user may later use these audio notes to quickly jump to the part of the audio recording corresponding to the respective audio notes.

In an exemplary embodiment, the capture device may be configured to automatically record audio upon capturing an image. For example, the user may set a pre-capture audio duration and a post-capture audio duration. When the user captures an image, audio is recorded before the image is captured for a duration equal to the pre-capture audio duration, and audio is recorded after the image is captured for a duration equal to the post-capture audio duration. A buffer in the capture device may be utilized to allow for the recording of audio before an image is captured. Once the image is captured and the audio is recorded, the captured image and recorded audio may be linked to each other using timestamps, as discussed with reference to FIG. 2.

Figure 7:
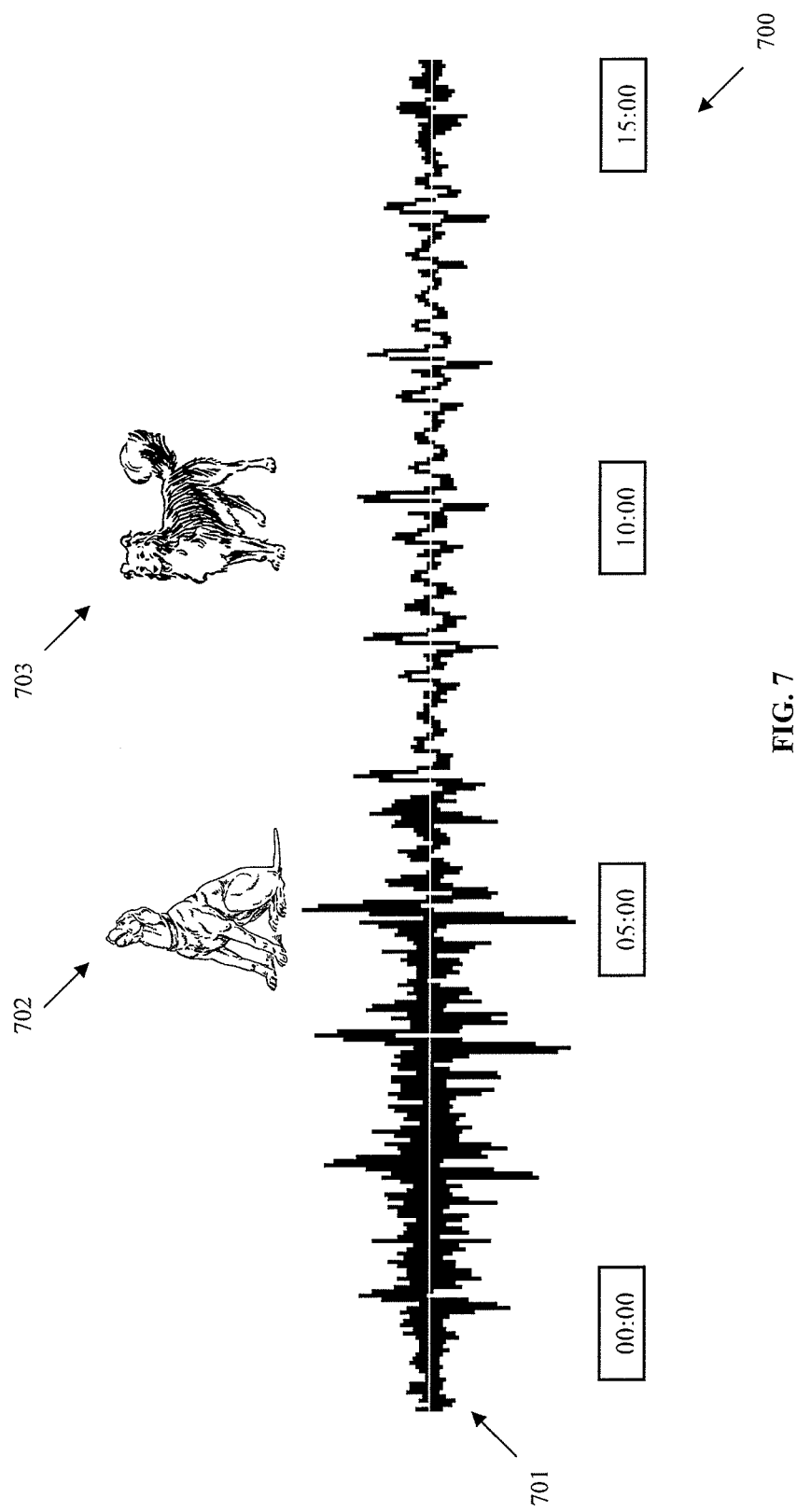
FIG. 7 is a timeline presenting recorded audio data and captured image data in a synchronized manner, according to an exemplary embodiment of the present disclosure.

In an exemplary embodiment, recorded audio data and captured image data may be presented to the user in a synchronized manner via a timeline, as shown in FIG. 7. The data may be presented to the user using various means. For example, the data may be presented to the user via a display disposed in the capture device, an external display connected to the capture device using, for example, a High-Definition Multimedia Interface (HDMI) connection, a Video Graphics Array (VGA) connection, a component connection, or a composite connection, or via software installed on a computer.

The user may view the timeline by selecting either a recorded audio file or a captured image. For example, when the user selects a recorded audio file, captured image files linked to the audio file are displayed at appropriate times during playback of the audio file. Similarly, when the user selects a captured image file, a corresponding section of the recorded audio file linked to the captured image file is played back while the captured image file is displayed. For example, in FIG. 7, a timeline 700 presented to a user includes an audio visualization 701 corresponding to the recorded audio data, and images 702, 703 corresponding to the captured image data. In FIG. 7, the recorded audio data has a total duration of 15 minutes. When the user selects the recorded audio file, the timeline 700 is presented to the user, and the recorded audio data is played back starting at the beginning of the recorded audio. As the audio data is played back, a first image 702 captured by the capture device 5 minutes into the audio recording is displayed at the 05:00 mark of the timeline, and a second image 703 captured by the capture device 10 minutes into the audio recording is displayed at the 10:00 mark of the timeline. The captured images 702, 703 may be linked to the audio recording at the appropriate times using timestamps, as discussed with reference to FIG. 2. The images 702, 703 may be displayed as thumbnails simultaneously with the audio visualization 701 as shown in FIG. 7, or the images 702, 703 may be displayed without the audio visualization 701.

Rather than selecting the recorded audio file, the user may select one of the captured image files. Upon the selection of an image file, the captured image 702, 703 is displayed, and the linked audio file is played back starting at a time corresponding to the captured image 702, 703. For example, referring to FIG. 7, when the user selects a first image file, the first captured image 702 is displayed, and the recorded audio is played back starting at the 05:00 mark. When the user selects a second image file, the second captured image 703 is displayed, and the recorded audio is played back starting at the 10:00 mark.

In exemplary embodiments, the user may configure the manner in which recorded audio data and captured image data are presented via the timeline. For example, the user may set a pre-display audio duration and a post-display audio duration for the audio data when selecting a captured image. The pre-display audio duration is the duration of audio occurring prior to the selected captured image that is to be played back, and the post-display audio duration is the duration of audio occurring subsequent to the selected captured image that is to be played back. Thus, referring to FIG. 7, if the user sets the pre-display audio duration to 5 seconds and the post-display audio duration to 20 seconds, when the user selects the first captured image 702, the recorded audio data will begin playback at the 04:55 mark and will end playback at the 05:20 mark. Similarly, when the user selects the second captured image 703, the recorded audio data will begin playback at the 09:55 mark and will end playback at the 10:20 mark. If the user does not set a pre-display audio duration and a post-display audio duration, when the user selects the first captured image 702, the recorded audio data will begin playback at the 05:00 mark and will continue until the end of the recorded audio data (e.g., the 15:00 mark). Similarly, when the user selects the second captured image 703, the recorded audio data will begin playback at the 10:00 mark and will continue until the end of the recorded audio data (e.g., the 15:00 mark).

Figure 8:
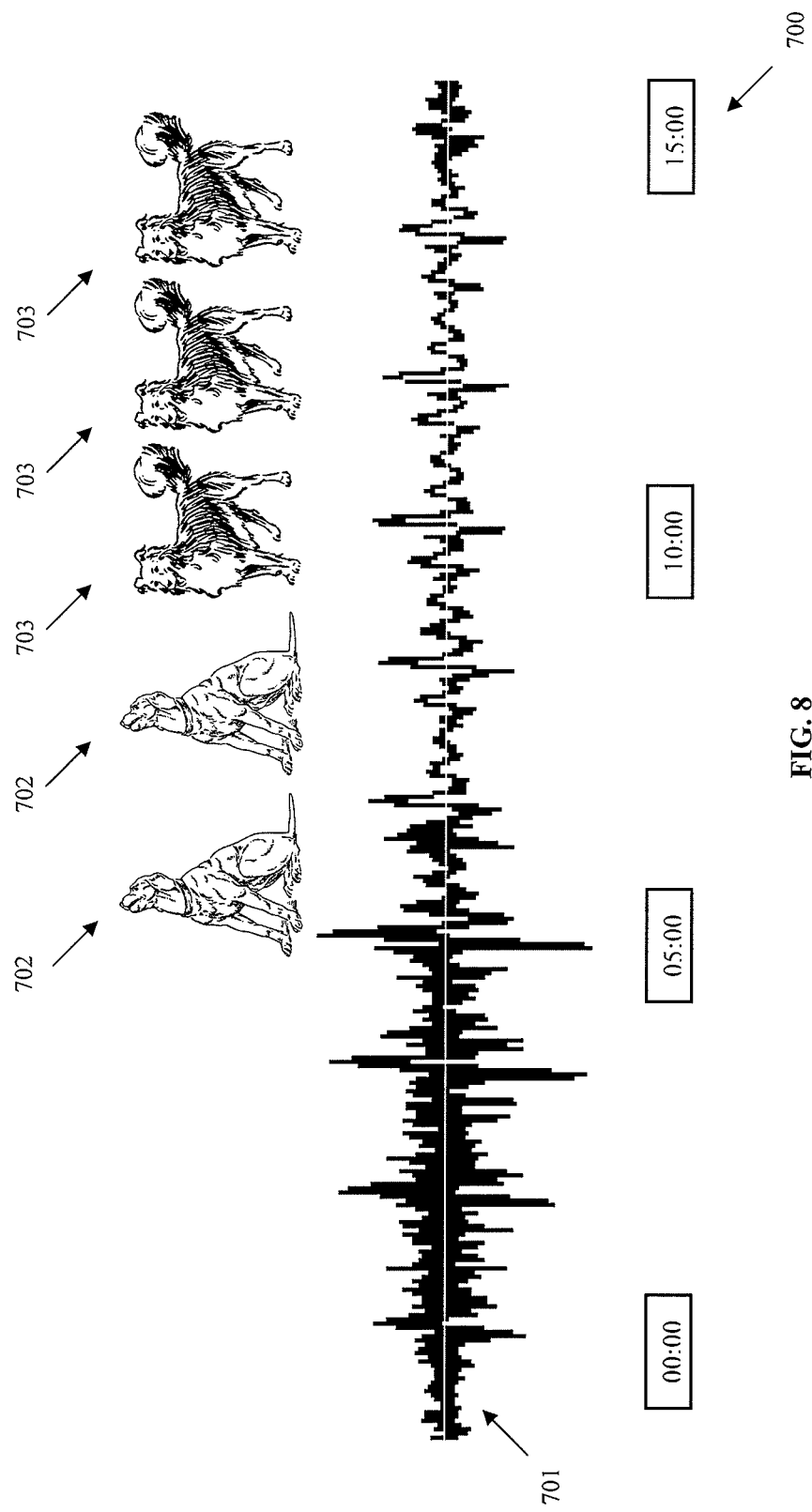
FIG. 8 is a timeline presenting recorded audio data and captured image data in a synchronized manner, according to an exemplary embodiment of the present disclosure.

The user may further set an image display duration. The image display duration is the duration of time a captured image is to be displayed. For example, referring to FIG. 7, if the user sets the image display duration to 5 seconds, the first captured image 702 will be displayed from the 05:00 mark to the 05:05 mark. Similarly, the second captured image 703 will be displayed from the 10:00 mark to the 10:05 mark. If the user does not set an image display duration, images will be displayed until it is time to display a subsequent image, as shown in FIG. 8. For example, in FIG. 8, the first captured image 702 is displayed at the 05:00 mark and is displayed until the second captured image 703 is displayed at the 10:00 mark.

In exemplary embodiments, when the user selects a captured image or a recorded audio file, the user may specify whether only the linked image and audio file should be presented, or whether subsequent images and audio files in the timeline should also be presented. Further, the user may be presented with only a timeline, and when the user selects a certain point on the timeline, the captured image and recorded audio file corresponding to that point on the timeline may be presented to the user.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of capturing image data while recording audio data, comprising:
   recording, by a microphone in a capture device, the audio data;
   capturing, by a camera in the capture device, the image data;
   linking, by a processor in the capture device, the recorded audio data and the captured image data based on a timestamp of the captured image data;
   storing the linked audio data and image data in a memory in the capture device;
   training the capture device to recognize a specified sound; and
   detecting the specified sound while recording the audio data,
   wherein the image data is automatically captured by the capture device in response to detecting the specified sound.

2. The method of claim 1, further comprising:
   linking each of a plurality of audio files to a subset of a plurality of image files using respective timestamps of each of the plurality of image files, wherein the audio data comprises the plurality of audio files and the image data comprises the plurality of image files; and
   storing each of the plurality of audio files in a different record in the memory in the capture device with each corresponding linked subset of image files.

3. The method of claim 1, wherein the audio data is recorded for a predetermined duration.

4. The method of claim 1, wherein the specified sound is a voice.

5. The method of claim 1, wherein:
   capturing the image data comprises capturing a plurality of images,
   a predetermined time interval exists between the capturing of each of the plurality of images, and
   the plurality of images are captured for a predetermined duration of time,
   wherein at least one of a number of the plurality of images, the predetermined time interval, and the predetermined duration of time are specified by a user of the capture device prior to capturing the image data.

6. The method of claim 5, wherein the plurality of images is a predetermined number of images.

7. The method of claim 1, further comprising:
   setting a first predetermined duration of time;
   detecting a same voice while recording the audio data, wherein the same voice is the specified sound; and
   capturing the image data in response to detecting the same voice for the first predetermined duration of time.

8. The method of claim 7, wherein:
   capturing the image data comprises capturing a plurality of images,
   a predetermined time interval exists between the capturing of each of the plurality of images, and
   the plurality of images are captured for a second predetermined duration of time,
   wherein at least one of a number of the plurality of images, the predetermined time interval, and the second predetermined duration of time are specified by a user of the capture device prior to capturing the image data.

9. The method of claim 8, wherein the plurality of images is a predetermined number of images.

10. The method of claim 1, further comprising:
    setting a first predetermined duration of time;
    detecting two or more voices while recording the audio data, wherein the specified sound comprises two specified sounds, and the two or more voices are the two specified sounds; and
    capturing the image data in response to detecting the two or more voices for the first predetermined duration of time.

11. The method of claim 10, wherein:
    capturing the image data comprises capturing a plurality of images,
    a predetermined time interval exists between the capturing of each of the plurality of images, and
    the plurality of images are captured for a second predetermined duration of time,
    wherein at least one of a number of the plurality of images, the predetermined time interval, and the second predetermined duration of time are specified by a user of the capture device prior to capturing the image data.

12. The method of claim 11, wherein the plurality of images is a predetermined number of images.

13. The method of claim 1, further comprising:
    playing back the image data and corresponding linked audio data in a non-sequential order based on a user selection.

14. The method of claim 1, further comprising:
    entering a training mode of the capture device, by a user of the capture device, prior to automatically capturing the image data,
    wherein the specified sound is recorded by the user using the microphone during the training mode, and subsequent detection of the specified sound triggers automatically capturing the image data.

15. A method of capturing image data while recording audio data, comprising:
    recording, by a microphone in a capture device, the audio data;
    capturing, by a camera in the capture device, the image data;
    linking, by a processor in the capture device, the recorded audio data and the captured image data based on a timestamp of the captured image data;

storing the linked audio data and image data in a memory in the capture device; and setting a predetermined noise level, wherein the image data is automatically captured by the capture device in response to determining that a noise level of the recorded audio data is greater than or equal to the predetermined noise level.

* * * * *